Figure 1:
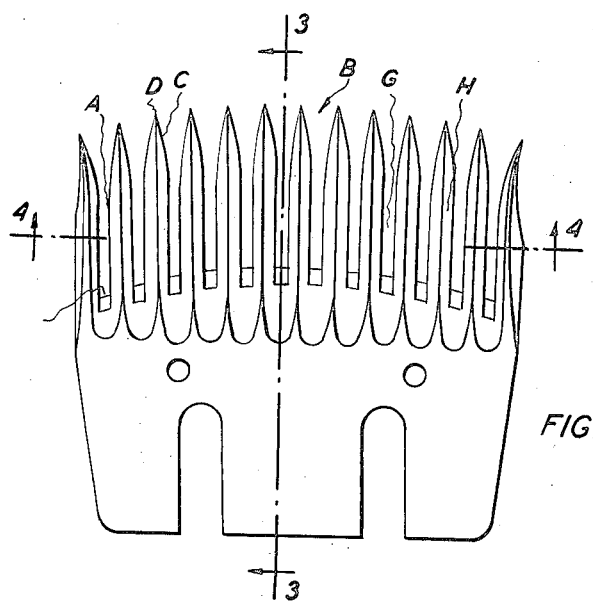

Dec. 17, 1935.  C. G. DUFTY  2,024,915
COMB FOR SHEEP SHEARING MACHINES
Filed Feb. 28, 1934

Inventor:
C. G. Dufty

UNITED STATES PATENT OFFICE 2,024,915

COMB FOR SHEEP SHEARING MACHINES

Clifford George Dufty, Quirindi, New South Wales, Australia

Application February 28, 1934, Serial No. 713,393
In Australia March 13, 1933

4 Claims. (Cl. 30—1)

It is universal practice in the design of sheep shearing machine combs to form the comb tines with concaved lateral contours and progressively acute in section from root to tip; the interspaces are necessarily of complementary shape; between the tine tips the clearance space is maximum, and thence back to the root line the clearance space narrows progressively into the gullets. From the tine tips to back beyond the cutter tip sweep arc the contraction in the width of the clearance spaces is very slow. The result is that burrs which pass into the interspaces during the passage of the shear through the wool are liable to become wedged between the tines and are held as rigid obstructions to the cutter movement. Very frequently breakage of the comb teeth occurs when heavy burrs so held are struck by the cutter, or the cutting edges of the comb tines and the cutter teeth are injured, and destructive mechanical stresses are imposed on parts of the handpiece and on the flexible shaft. Losses by comb and cutter breakage and injury to machines and shafts in the shearing of sheep which carry heavy burr are in many cases quite serious; heretofore these losses have been tolerated, no means being available for obviating them.

One object of the present invention is to provide means for substantially eliminating these inconveniences and losses. The problem has been solved by a modification in comb design which results in automatic rejection of burr as the comb passes into the wool, or results in the holding of burrs between the comb tine spaces so loosely that they are released and rejected downward when they are struck by the cutter.

Another object of the invention is to minimize risk of slitting and slashing the teats and the skin of the sheep. In all known sheep shearing machine combs the spacings between the comb tines and at and rearward of the arc which is traversed by the points of the cutter are so wide and the pitch of the lateral faces of the teeth is so nearly erect with respect to the comb face, that folds of the sheep's skin may be drawn or forced up between the tines so that they come above the comb face and are struck by the cutter. This condition is most notable in the case of wrinkly sheep. Considerable injury to the sheep results, as the skin folds which are obtruded above the comb face are slit and slashed by the cutter and teats are frequently cut off. My comb minimizes these injuries to the sheep because the spaces between its teeth, from about the cutter tip arc back to the gullets, are substantially parallel sided and very narrow, and the bottom edges of the teeth are obtusely chamfered, so that it is practically impossible for the sheep's skin to work up between the comb teeth; the design of my comb is such that it tends to ride down the skin folds and slack skin which it encounters and to spread the skin under the comb, so preventing contact of the cutter with it.

To attain these objects the comb tines are formed substantially parallel with each other and with parallel or substantially parallel side edges with parallel side edges extending from the gullets to about the arc which is swept by the cutter points, and the spaces between the tines rearward of the arc are made quite narrow compared with the spaces in combs of conventional design. The underneath edges of the teeth are also chamfered obtusely so that the interspaces are less wedgelike in section than in combs of conventional design, and the sides of the tines are shaped convex from about the cutter sweep arc line to their points. The narrowing of the spacings between the tines and the desirability of limiting the width of the tines renders it necessary to provide a larger number of tines for a comb of any given width than would be otherwise necessary. Thus in practice a 2½ inch comb has ten tines usually, whilst for serving the purposes of my invention 2½ inch combs are formed with thirteen tines. Whatever the comb width may be the width across the tine faces should be one eighth of an inch or slightly less and the width of the spacings intervening the tines should not exceed one tenth of an inch. The width of the intervening spaces may be reduced to one twelfth of an inch but the advantage of the invention would be definitely diminished if their width is in excess of one tenth of an inch.

The distinction between my comb and combs which are now in use is that in my comb the intervening spaces (regarded in top plan view) are relatively narrow and are practically parallel from the gullets up to the cutter sweep arc, and that the top edges of the tines are substantially rectangular in section, while the underneath edges are chamfered obtusely; whereas in the known combs the tine spacings are relatively wide compared with the width of the tines and their sides slope concavely from the tine tips back past the cutter sweep arc to the gullets and the chamfering is quite acute from behind the cutter sweep arc up to the tine points. In my comb it is necessary in order to obtain the fullest advantage thereof that the spaces between the tines should flare rapidly from about the cutter point sweep arc forwardly to the tips.

Burrs which enter the tine spaces in my comb are held unstably between the comb tines and are dislodged when struck by the cutter and are immediately released downward. Risk of cutter and comb breakages referable to this cause is thus substantially eliminated. Also the sheep's skin is caused to draw flatwise under the comb so that its tendency to extrude upward between the comb teeth and come into the swath of the cutter is diminished.

For better explanation, an explanatory sheet of drawings is attached hereto:—

In the drawing:—

Figure 4:
Figure 3:
Figure 2:
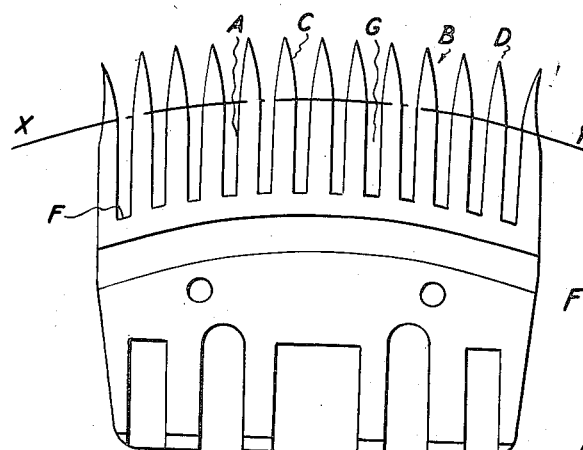

Fig. 1 is an underneath plan of the comb;

Fig. 2 a top plan of it;

Fig. 3 a longitudinal section through the comb on the centre line of one of the tine spacings line 3—3 Fig. 1; and Fig. 4 a transverse section on the line 4—4 Fig. 1.

The sides A of the comb tines B are convexed (C) rapidly to their points D from a position about the arc X—Y which is swept by the cutter points, and back from about that arc to the gullets F they are quite parallel or are convexed on a very long and gradually increasing radius so that they are very nearly parallel. The spacings G are thus substantially parallel rearward of the arc X—Y to the gullets, while near the tine tips D, where burrs are usually caught, they offer an obtuse entry in the flare shape of the space, so that the burrs are held so unstably between the tines that they are released and rejected downwardly immediately they are struck by the cutter. The underneath edges of the tines are obtusely chamfered as shown at H in Figs. 3 and 4, the chamfering merging into the sides of the tines close to the tips as shown in Fig. 4. The obtuse angle H of the tooth chamferings facilitates the release of burrs downwardly. This shaping of the tines and the skin spreading effect which results from the sectional shape of the chamferings on the lower edges of the tine sides operates to keep the skin of the sheep down so that skin folds and teats will not obtrude above the comb face where they would be gashed by the cutter. The narrowness of the spacings is a factor in the obtaining of these results.

For better clarity the thickness of the comb is shown exaggerated in the drawing; Figs. 3 and 4 show a full thickness new comb. The comb is too thin for use when it has been repeatedly resharpened so that its face has come down to the top edges of the chamferings L.

Having now particularly described and ascertained the nature of my said invention and in what manner the same is to be performed, I declare that what I claim is:—

1. A sheep shearing machine comb having a plurality of tines substantially uniform in width, the tines being so disposed that the spaces intervening the tines are also substantially uniform in width rearward of the cutter sweep arc, and so that the width of the spaces approximates but does not exceed one tenth of an inch, the width of the tines approximating one eighth of an inch, the said tines being tapered to the points forwardly of the cutter sweep arc, and the undersides of the tines being chamfered obtusely.

2. A sheep shearing machine comb having its tines disposed substantially in parallel, with relatively narrow intervening spaces of uniform width, the width of the spaces being sufficiently small to prevent burrs from being retained between the tines, or the skin of the sheep from being injured by the device, said tines being substantially uniform in width from the gullets to about the cutter tip sweep arc and thence tapered convexly to the points, the top edges of said tines being substantially rectangular in section, and the under surface of the tines having slanting faces tapering downwardly to an apex, the said slanting faces being concave in cross section.

3. A sheep shearing machine comb having its tines disposed substantially in parallel, with relatively narrow intervening spaces of uniform width, the width of the spaces being sufficiently small to prevent burrs from being retained between the tines, or the skin of the sheep from being injured by the device, said tines being substantially uniform in width from the gullets to about the cutter tip sweep arc and thence tapered convexly to the points, the top edges of said tines being substantially rectangular in section, and the under surfaces of the tines having slanting faces tapering downwardly to an apex, the said slanting faces being concave both in transverse section and along their longitudinal extent.

4. A sheep shearing machine comb having its tines disposed substantially in parallel, with relatively narrow intervening spaces of uniform width, the width of the spaces being sufficiently small to permit burrs from being retained between the tines or the skin of the sheep from being injured by the device, said tines being substantially uniform in width from the gullets to about the cutter tip sweep arc and thence tapered convexly to the points, the top edges of said tines being substantially rectangular in section, and the underneath edges being chamfered obtusely.

CLIFFORD GEORGE DUFTY.